US011252863B2

(12) United States Patent
Andersson et al.

(10) Patent No.: US 11,252,863 B2
(45) Date of Patent: Feb. 22, 2022

(54) SYSTEM FOR MOWING LAWNS WITH ROBOTIC LAWN MOWERS AND A CHARGING MOBILE CARRIER

(71) Applicant: ROBOTIC LAWN CARE SWEDEN AB, Fagersta (SE)

(72) Inventors: Kalle Andersson, Fagersta (SE); Per Andersson, Uppsala (SE)

(73) Assignee: Robotic Lawn Care Sweden AB

( * ) Notice: Subject to any disclaimer, the term of this patent is extended or adjusted under 35 U.S.C. 154(b) by 389 days.

(21) Appl. No.: 15/781,572

(22) PCT Filed: Nov. 23, 2016

(86) PCT No.: PCT/SE2016/000073
§ 371 (c)(1),
(2) Date: Jun. 5, 2018

(87) PCT Pub. No.: WO2017/099644
PCT Pub. Date: Jun. 15, 2017

(65) Prior Publication Data
US 2019/0110395 A1    Apr. 18, 2019

(30) Foreign Application Priority Data

Dec. 6, 2015 (SE) .................................. 1530185-6
Dec. 14, 2015 (SE) .................................. 1530190-6

(51) Int. Cl.
*A01D 34/00* (2006.01)
*A01D 75/00* (2006.01)
(Continued)

(52) U.S. Cl.
CPC ........... *A01D 34/008* (2013.01); *A01D 34/78* (2013.01); *A01D 75/004* (2013.01);
(Continued)

(58) Field of Classification Search
CPC .... A01D 34/008; A01D 34/78; A01D 75/002; A01D 75/004; A01D 75/006;
(Continued)

(56) References Cited

U.S. PATENT DOCUMENTS

| 3,933,258 | A | 1/1976 | Forsyth et al. |
| 6,139,247 | A | 10/2000 | Wright |
| 8,306,659 | B2 * | 11/2012 | Abramson ............. B25J 9/0003 700/250 |
| 2009/0315501 | A1 | 12/2009 | Li et al. |

(Continued)

FOREIGN PATENT DOCUMENTS

| EP | 2336801 A2 | 6/2011 |
| EP | 2870852 A1 | 5/2015 |

(Continued)

OTHER PUBLICATIONS

International Search Report corresponding International application PCT/SE2016/000073, dated Mar. 1, 2017, 4 pages.

*Primary Examiner* — Alicia Torres
(74) *Attorney, Agent, or Firm* — RatnerPrestia

(57) ABSTRACT

A system, for cutting a plurality of lawns, including: two or more robotic lawn mowers which each has a rechargeable energy storage, and a carrier, which includes: at least two holders, each of which is capable of retaining one of the two or more robotic lawn mowers, and two or more fences, each fence delineating an individual lawn of the plurality of lawns and configured to be operable while a respective of the two or more robotic lawn mowers is operating at the respective of the plurality of lawns.

11 Claims, 4 Drawing Sheets

(51) Int. Cl.
*A01D 34/78* (2006.01)
*B60L 53/30* (2019.01)
*B60P 3/06* (2006.01)
*G05D 1/02* (2020.01)
*A01D 101/00* (2006.01)

(52) U.S. Cl.
CPC ............ *A01D 75/006* (2013.01); *B60L 53/30* (2019.02); *B60P 3/06* (2013.01); *G05D 1/0225* (2013.01); *G05D 1/0265* (2013.01); *G05D 1/0287* (2013.01); *A01D 2101/00* (2013.01); *B60L 2200/40* (2013.01); *G05D 1/0219* (2013.01); *G05D 2201/0208* (2013.01)

(58) Field of Classification Search
CPC ......... B60L 53/30; B60P 3/06; G05D 1/0225; G05D 1/0265; G05D 1/0287
See application file for complete search history.

(56) References Cited

U.S. PATENT DOCUMENTS

| | | | |
|---|---|---|---|
| 2012/0205413 A1 | 8/2012 | Degenstein et al. | |
| 2013/0002198 A1 | 1/2013 | McCluskey et al. | |
| 2014/0121881 A1* | 5/2014 | Diazdelcastillo | G05D 1/0265 |
| | | | 701/23 |
| 2015/0201555 A1* | 7/2015 | Willgert | G05D 1/0274 |
| | | | 701/26 |
| 2016/0055743 A1* | 2/2016 | Raj | B60L 53/14 |
| | | | 701/22 |
| 2016/0242356 A1* | 8/2016 | Velderman | A01D 69/025 |

FOREIGN PATENT DOCUMENTS

| | | | | |
|---|---|---|---|---|
| EP | 2870853 A1 | 5/2015 | | |
| EP | 2913732 A1 | 9/2015 | | |
| GB | 2358843 A * | 8/2001 | ........... | G05D 1/0265 |
| WO | 199423351 A1 | 10/1994 | | |
| WO | 2010077198 A1 | 7/2010 | | |
| WO | 2013072306 A1 | 5/2013 | | |

* cited by examiner

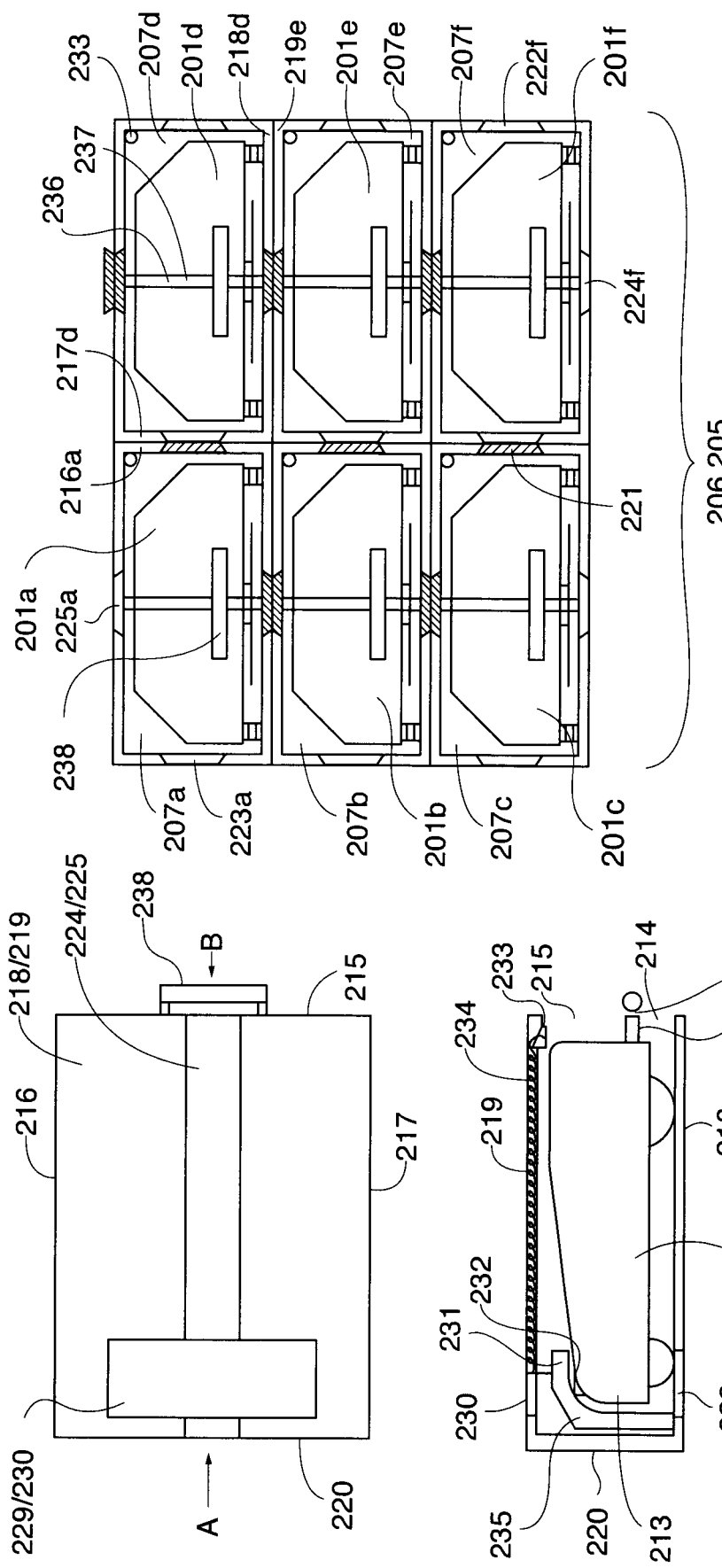

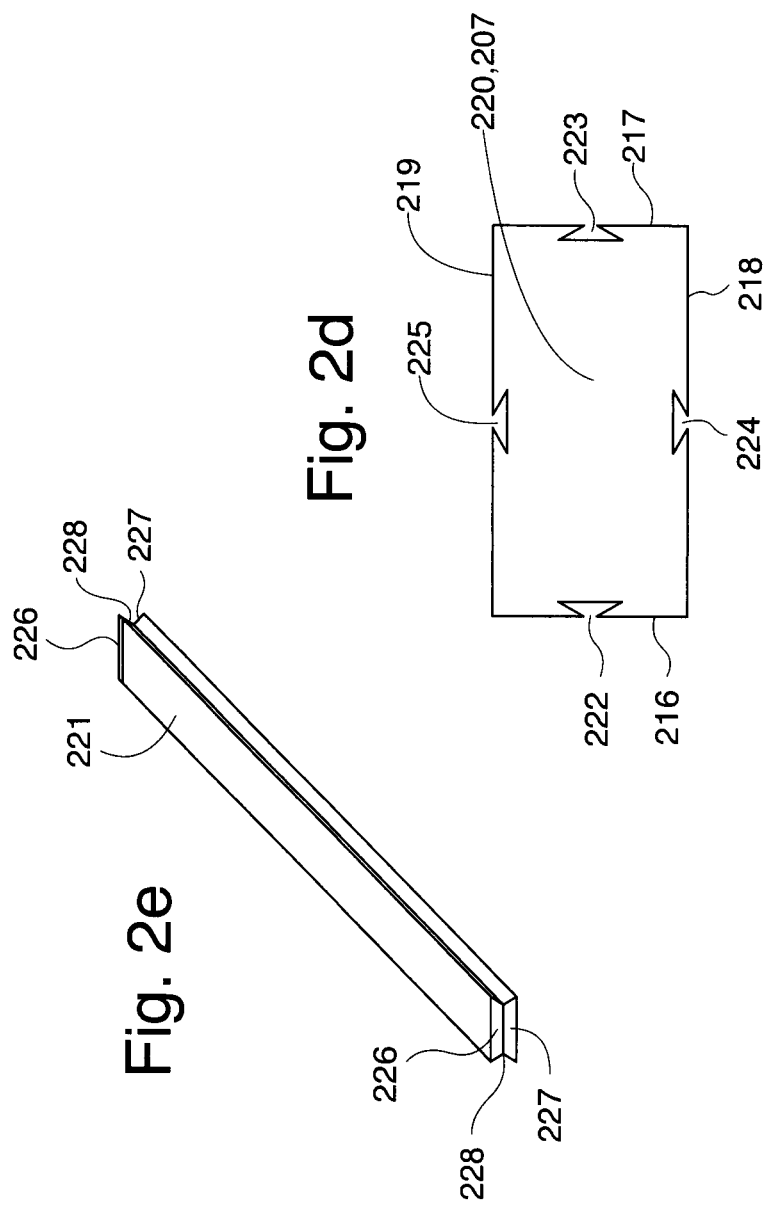

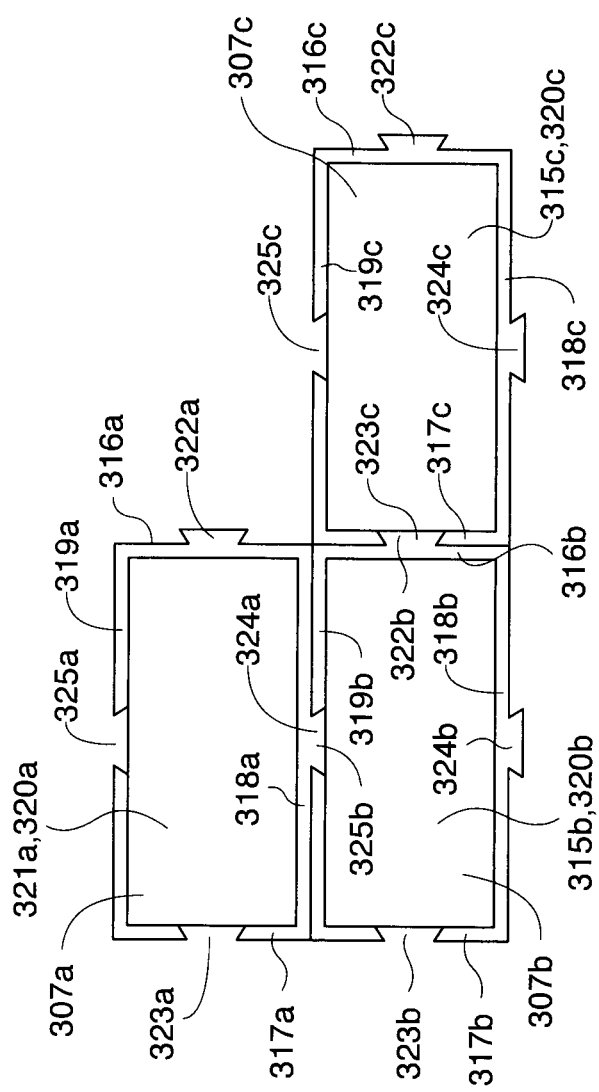

SYSTEM FOR MOWING LAWNS WITH ROBOTIC LAWN MOWERS AND A CHARGING MOBILE CARRIER

TECHNICAL FIELD

The present invention relates to a management system and a method for mowing a plurality of lawns by the use of two or more robotic lawn mowers. The invention also includes a carrier for transporting and/or storing lawn mowers which can be used by the system in carrying out the method.

TECHNICAL BACKGROUND

Robotic lawn mowers have been available for about 20 years. They are typically electric and powered by a rechargeable battery. A typical set up comprises a lawn mower, a fence sensed by the lawn mower and delineating the area to be mowed (=lawn), and a base station also called docking station which is connected to the fence. The fence may be virtual or physical. It shall hinder the lawn mower from escaping the delineated area. Virtual fences are illustrated by GPS based systems which with today's technology should be based on local senders at selected spots in close association with a lawn to be mowed. The most popular form of physical fences is an electrical wire or cable. A fence may, in addition to hinder the lawn mower from escaping, also function as guiding means for the lawn mower to find different positions from which it can start working. For electric fences there may be additional electric cables functioning as additional guiding means. The base station typically provides power connections for recharging the battery of the lawn mower and/or power to the fence if its delineation ability is based on electro-magnetic fields. The typical robotic lawn mower has a control unit including e.g. various sensors and soft-ware that enable the lawn mower to evenly mow a delineated area, retain itself within the area, alarm when leaving the area etc.

"Electric" and "battery powered" will be used synonymously in the context of the invention if not otherwise indicated.

There are robotic lawn mowers which utilize wireless communication which allows nearby and/or remote control and check of the work and well-being of a mower. Advantages with distance control of robotic lawn mowers have been indicated for caretakers who handle a plurality of different properties or lawns by the use of two or more robotic lawn mowers, e.g. with one lawn mower per property or lawn. See publication (f) below.

There are several published patents and patent applications which concerns electric robotic lawn mowers. See for instance
a) EP 2870852 (Honda Research Institute Europe GmbH, Lawn mower with network communication),
b) EP 2870853 (Honda Research Institute Europe GmbH, Lawn mower with remote control),
c) EP 2913732 (LG Electronics Inc, Lawn mower robot and method for controlling the same),
d) U.S. Pat. No. 9,137,943 (Honda Research Institute Europe GmbH, Trainable autonomous lawn mower),
e) WO 9423351 (Cat Systems Ltd, Localizing system),
f) WO 2010077198 (Husqvarna AB, An autonomous robotic lawn mower and a method for establishing a wire-less communication link between the lawn mower and the user).

Robotic lawn mowers have primarily been intended for single lawns or single properties (home lawn/home property), i.e. once being installed on its home lawn the robotic lawn mower will mainly be used there. The areas of the lawns have typically been relatively small. The software that controls charging and available mow time has aimed at securing a long life time of the batteries (typically several years). Relatively long resting times and long charging times have normally been a common feature and not of a big concern. The cutting capacity in $m^2/day$ has been relatively low. This kind of robotic lawn mowers has not been particularly well-adapted to larger areas. One of the main objects has been to increase the owner's spare time for doing other things.

All patent applications and issued patents cited in this specification are in their entirety incorporated by reference.

OBJECTS OF THE INVENTION

The present invention focuses on professional care takers who are responsible for cutting the lawns of several properties and/or real estates, i.e. responsible for a plurality of lawns. Commercially available robotic lawn mowers have not been suitable for multi lawn care takers. In addition these lawns are often publicly available and are at a high risk for thefts and damages by by-passers. The first choice has been riding mowers because of their high capacity in $m^2/day$ in spite of considerably higher costs for investment, fuel, labour and a negative environmental impact from noise and exhaust gases.

There is a need for providing robotic lawn mowers which permit increased effective operational times (hours/day) and/or increased cutting capacity in $m^2/hour$. The lawn mowers should be arranged in a system that minimizes risks for thefts and damages.

A system for professional care takers responsible for several estates/properties should be designed to facilitate easy transportation of the robotic lawn mowers between different lawns/properties/real estates and a storing facility in order to accomplish a time-efficient and economic use of the lawn mowers.

Thus care takers responsible for a plurality of lawns using robotic lawn mowers will encounter other problems and have other demands than single lawn care takers.

The objects of the invention aim at providing solutions to the problems and demands mentioned above.

DRAWINGS

FIG. 1 illustrates important parts of the inventive system plus a care taker with his personal digital unit and a storing facility containing a carrier according to the invention.

FIGS. 2a-e illustrate a modular carrier containing several holders (=modules) and a locking principle for keeping the modules together in the form of a stand.

FIG. 3 illustrates an alternative locking principle for a modular carrier.

Reference numerals in the figures comprise three digits. The first digit refers to the number of the figure and the second and third digits to the specific item. Corresponding items in different figures have as a rule the same second and third digits.

THE INVENTION

The first aspect of the invention is a managing system suitable for cutting a plurality of lawns (102a,b . . . ). The second aspect of the invention is a method in which the system may be used. The third aspect of the invention is a carrier (105a,105a+b,111,205) that can be used in the first and second aspect of the invention.

First Aspect (System)

The system is characterized in comprising:

A) two or more robotic lawn mowers (101,101a,b . . . 101'a,b . . . 201a,b . . .) which each has a rechargeable energy storage, and B) a carrier (105a,105a+b,111,205), preferably mobile, which comprises a) two or more holders (107a,b . . . , 112a,b . . . , 207a,b . . . , 307a,b . . .) each of which is capable of retaining one of the robotic lawn mowers, and b) a charging system (231/235+233+234) for charging said rechargeable energy storage.

The holders are preferably part of a stand (206,111) as discussed further down under the heading "Third aspect (carrier).

The robotic lawn mowers are essentially functionally and/or geometrically equal. This also applies for the holders. Geometrically equal means that their design is such that any of the robotic lawn mowers fits into any of the holders.

Every one of the robotic lawn mowers typically has a motor for driving and cutting and an energy storage which is rechargeable. This energy storage is typically a rechargeable battery if the motor is electric or a tank for fuel if the motor is based on combustion of a fuel, such as gasoline, gas including for instance hydrogen, mixtures of low molecular hydrocarbons, biogas, natural gas etc. The term "a motor" in the context of the invention includes variants where there are separate motors for driving and cutting. The rechargeable energy storage includes that there are means on the mower for recharging from an external power supply system via the charging system of the mobile carrier. If the energy storage on the mower is a rechargeable battery there will also be an electric contact (232) on the mower (201) for connecting the mower's battery to an electrical power supply system external to the robotic lawn mower via the charging system of the carrier (105a,105a+b,111,205). For other variants of the energy storage the recharging means may include a filler cap with a tank, a holder for a replaceable gas cylinder etc.

The rechargeable energy storage may comprise a fuel tank, a gas cylinder, a battery etc which is exchangeable with another fuel tank, gas cylinder, battery etc. of the same kind. In such variants an empty fuel tank, gas cylinder, battery etc. may be exchanged with a filled up tank, gas cylinder, battery etc. In these variants charging/recharging of the energy storage may take placed without using the charging system of the carrier (105a,105a+b,111,205) which preferably is mobile.

The charging system (231/235+233+234) of the carrier comprises means for connection of the individual mowers placed on the carrier with an external power supply system in order to fill up rechargeable energy storage of the mower. For battery powered robotic lawn mowers, the carrier's charging system comprises the proper electric contacts (231/235 and 233) and cables (234) as discussed under the heading "Third aspect (carrier)" below. For fuel based robotic lawn mowers the carrier's charging system comprises the appropriate hoses and hose couplings.

The robotic lawn mowers of the inventive system manage with a) A daily effective cutting time (=daily operational time) which typically is 1.5 hours/mower, such as ≥2 hours/mower, with preference for ≥4 hours/mower, such as ≥6 hours/mower or ≥8 hours/mower. Upper limits are typically ≤24 hours/mower, such as ≤16 hours/mower or ≤12 hours/mower; and/or b) A cutting capacity which typically is ≥100 m$^2$/hour, such as ≥150 m$^2$/hour, with preference for ≥200 m$^2$/hour, such as ≥300 m$^2$/hour or ≥400 m$^2$/hour during the operational time. Typical upper limits are ≤1000 m$^2$/hour, such as ≤800 m$^2$/hour or ≤600 m$^2$/hour; and/or c) A cutting time without recharging which typically is ≥1.5 hours/mower, such as ≥2 hours/mover, with preference for ≥4 hours/mower, such as ≥6 hours/mower or ≥8 hours/mower with an upper limit which typically is 24 hours/mower, such as ≤12 hours/mower or ≤10 hours/mower or ≤8 hours/mower; and/or d) A cutting area without recharging which typically is ≥200 m$^2$/mower, such as ≥300 m$^2$/mower with preference for ≥800 m$^2$/mower, such as ≥2000 m$^2$/mower or ≥4000 m$^2$/mower with an upper limit which typically is ≤24 000 m$^2$/mower, such as ≤12000 m$^2$/mower or ≤10000 m$^2$ hours/mower or ≤8000 m$^2$/mower or ≤5000 m$^2$/mower.

These values are measured on a flat dry green lawn with its grass recently cut by the same kind of mower as the one to be tested. The lawn is dry in the sense that there is no rain or dew on it. For (c) and (d) the term "recharging" refers to recharging the rechargeable energy storage of the robotic lawn mower. For each of (a), (b), (c) and (d), specific ranges obtained by combining any ≥-value with any ≤-value are included (all combinations included).

For electric robotic lawn mowers these features may be accomplished by including software in the system for optimizing battery usage to give long daily operation times (in hours) by proper control of amperage and temperature during recharging and frequency and length of recharging and mowing periods. For fuel based robotic lawn mowers these features may be accomplished by proper optimization of tank size and motor effect. In other words, this variant of the inventive system comprises that the rechargeable energy storages, such as batteries, of the individual robotic lawn mowers and the software are adapted to each other to optimize features (a) and/or (b) and/or (c) and/or (d) to be as outlined in the preceding paragraph. This in particular applies to the preferred values. For most prior art electric robotic lawn mowers intended for single lawns, the optimization has been for battery life length (in years).

In one variant of the inventive system one, two, three or more of the robotic lawn mowers of the system or on a carrier of the system are capable of cutting without recharging the largest one of the plurality of lawns to be cut, typically the delineated area. The upper limit for the number of mowers on a carrier complying with this criterion is typically the same as the number of holders on the carrier. For an immobile carrier (111) of the invention placed in a storing facility (110), it may be convenient to store robotic lawn mowers that differ in this respect.

The expression "comprising . . . a carrier" includes that there may be one, two or more functionally similar carriers, preferably mobile, in the inventive system. One carrier may be used for deliverance to a lawn while another carrier is used for fetching the robotic lawn mower from the lawn and vice versa.

The carrier used in the inventive system and/or method is typically mobile (105a,105a+b).

Mobile and immobile carriers for use in the inventive system and/or method are further discussed under the heading "Third aspect (Carrier)". See below.

A further variant of the inventive system comprises a fence (103a,b . . .) delineating the individual lawns to be mowed. See "Technical Background" above. In these variants of the invention every lawn typically has a base station (104a,b . . . ) for docking of a robotic lawn mower (101a,b . . . ) working on the lawn (103a,b . . . ). This base station may be capable of
a) charging the rechargeable energy storage, e.g. a rechargeable battery, of a lawn mower docked to the station, and/or
b) identifying and pairing/matching a robotic lawn mower placed on a lawn with the lawn, and/or
c) providing power/electricity to an electric fence, if present, and/or to other possible guiding means/cables.

Docking of a lawn mower in the context of the invention includes either one or both of (a) and (b) where (b) can be via wire or wireless. When mower features (c) and/or (d) (cutting time without recharging and cutting area without recharging, respectively) are large enough for a mower, it will be able to cut the delineated area of a lawn without recharging. If this applies to all mowers used for a set of lawns, the base stations of these lawns may be devoid of the charging function (a) above. For battery powered mowers the base station may be connected to the electric mains or comprise a rechargeable battery having sufficient capacity for recharging the mower and/or supporting power to the fence.

The term "cable" in the context of an electric fence used in the inventive system includes also wires.

One or more of the base stations of a variant believed to be advantageous comprise
A) a fixed part placed at a lawn to be cut, and
B) a removable part (mobile part) which contains at least one of
  a) a circuit card necessary for charging the battery of the robotic lawn mower docked to the base station and/or for providing voltage to an electric fence, if present, and/or
  b) a battery or solar cell providing voltage to the fence delineating the lawn of the base station Including also other electric guiding means linked to the base station.

This variant of base stations is only useful for systems of the invention which utilize an electric fence and/or an electric robotic lawn mower.

The system preferably also comprises a control system in which there are different kinds of control units which may be placed on different parts of the system. Typically such units are a) a mower control unit on every one of the robotic lawn mowers, and b) a base unit control unit on every one of the base units. These units comprise a hard ware part and typically also a software part. In addition the control system of the inventive system also comprises additional software which typically is placed on external hardware e.g. a server or as a so-called app on a separate digital unit, such as a separate PC, smart phone and the like. This additional software is part of a common control unit of the control system and is physically separated from the mower control units and the base station control units. The mower control units are preferably essentially equal. The base station control units are also essentially equal.

In particular the mower control units are capable of communicating back and forth with the common control unit and preferably also with the base station control units. The communication with the common control unit is typically wire-less, in particular for the mower control units. The communication between a base station and a mower may be via wire or wire-less. To manage with the wireless communication the mower control units and the base station control units have transmitters and receivers. The common control unit may utilize transmitters and receivers that are external to the inventive system.

The software of the control system may comprise memories for storing
A) information about the individual lawns and mowers, such as one or more of identification labels of individual mowers and/or lawns, cutting pattern of individual lawns, possible errors, battery status, sensors, cutting journals for individual mowers and/or lawns, alarm programs for alerting when something goes wrong etc, and
B) programs for treating this information and for transmitting this information between different types of control units.

The software of the inventive system preferably has a program for setting up lawn specific cutting programs including cutting pattern for every lawn to be cut. A lawn specific cutting program takes into account the geometry defined by the guiding fence and if present other guiding cables. The program for setting up lawn specific cutting programs and the lawn specific cutting programs as such are typically placed on a common control unit, such as a server and/or an external digital unit such as a smart phone. They may also be placed on the base station control units and/or on the mower control units with preference for the latter.

The software of the most preferred inventive system also has a program for alerting the caretaker if a mower placed on a lawn is leaving a geofence area, e.g. defined as the area within a certain distance from the cutting area and/or from the base station of the area. The geofence area is lawn specific and typically GPS-based. The program gives the position of a mower having left the geofence area as GPS-coordinates. The geofence areas are preferably stored on the same control unit as the lawn specific cutting programs. The geofence alarm system terminates at the common control unit, for instance the care taker's smart phone or other digital unit. Its main goal is to alert the care taker when a mower is stolen.

Activation of a lawn specific cutting program and a geofence alarm are preferably done during docking of a robotic mower to the base station of a lawn to be mowed (identification and pairing of mower with lawn).

Every robotic lawn mower comprises preferably at least one sensor, e.g. based on IR and/or ultra sound and/or a camera, for detecting obstacles in front of a robotic lawn mower when on duty. These kinds of sensors are part of hardware of the mower control units and are capable of ordering a robotic lawn mower to slow down and/or to pass by an obstacle.

The weight of a robotic lawn mower of the inventive system is at least 2 kg, such as at least 5 or 10 kg. Upper limits are 100 kg, 85 kg, 30 kg or 20 kg. An optimal range is 5-21 kg, such as 8-20 kg.

Suitable robotic lawn mowers will typically exhibit a weight to cutting capacity ratio in the interval of 0.01-0.2 $kg/m^2/hour$ (WCCR-value or PA-value). This in particular applies to robotic lawn mowers in the weight range 5-21 kg, such as 10-20 kg. At least 1, 2, 3, 4, 5, 6, 7, 8, 9, 10 or more of the robotic lawn mowers of the inventive system, or used in the inventive method or loaded on the inventive carrier comply with this criterion. Alternatively ≥10%, such as ≥20%, ≥30%, ≥40%, ≥50%, ≥60%, ≥70%, ≥80%, ≥90% or 100% of the robotic lawn mowers loaded on the carrier of the system complies with the criterion.

The robotic lawn mowers of the inventive system should have a color which contrasts against a green lawn, e.g. at least at the top of the mowers. Suitable colors are red, black, blue, white etc. including fluorescent variants thereof in which case green also is possible.

Further variants of the system aspect of the invention may utilize applicable features defined under the headings "Second aspect (method)" and "Third aspect (carrier)". The preferences for corresponding features in different aspects are essentially the same.

The second aspect of the invention (Method)

This aspect is a method for mowing a plurality of lawns (102a,b . . . ) in which the system discussed above or defined in the appending patent claims can be used. The main characteristic feature of the method is the steps of:
i) providing two or more robotic lawn mowers (101a,b . . . ) which each has a rechargeable energy storage,
ii) delivering and starting at least one mower, e.g. one, two or three, to each lawn (102a,b . . . ) to be mowed,
iii) allowing the robotic lawn mowers (101a,b . . . ) to mow the lawns (102a,b . . . ) on which they have been placed,
iv) fetching the robotic lawn mowers (101a,b . . . ) after they have finalized the mowing of the lawns (102a,b . . . ) on which they have been placed in step (ii), and
v) if needed recharging the robotic lawn mowers (101a,b . . . ).

The steps are carried out in sequence. Step (v) is optional.

In a preferred variant the robotic lawn mowers are part of the system defined under the heading "First aspect (System)" and provided on a mobile carrier (105a,105a+b) which comprises
a) at least one holder (107a,b . . . ) with preference for two or more holders each of which is capable of retaining one of the robotic lawn mowers (101a,b . . . ), and
b) a charging system 231/235+233+234) for said rechargeable energy storage.

This variant of the method also includes that other features of the inventive system and/or carrier as defined herein and/or in the claims may be provided in step (ii).

Step (ii) includes that one secures that the robotic lawn mowers are charged and placed in the holders of the carrier. This securing may take place at a storing facility (110) before deliverance to the lawns or equivalently at their deliverance to a lawn to be cut (provided this lawn is equipped with a base station providing charging capability). Step (iv) typically comprises fetching by the use of the carrier, and preferably placing the robotic lawn mowers in a storing facility (110) or delivering them to other lawns to be cut. The carrier used for fetching is not necessarily the same one as used for deliverance in step (ii) (see above). The storing facility may be the mobile carrier as such, a separate house (110), yard or the like.

Charging/recharging of the robotic lawn mowers in the context of the method aspect includes that the rechargeable energy storage is permanently mounted on a robotic lawn mower or is replaceable, such as comprising a replaceable fuel tank, gas cylinder or battery etc as discussed above for the first aspect of the invention. In other words charging/recharging in the method aspect can be carried out a) with the rechargeable energy storage permanently mounted on the mower or b) by replacing a non-filled up energy storage on a robotic lawn mower with a filled up energy storage, typically in the form of a rechargeable fuel tank, a rechargeable gas cylinder, a rechargeable battery etc.

The holders (107a,b . . . ) are preferably part of a stand (106,206) as discussed further down under the heading "Third aspect (carrier).

In the case two or more robotic lawn mowers are delivered in step (iii) to work on the same delineated area, it might be beneficial to program them with complementing cutting pattern in order to obtain the most efficient cutting including also time savings. This may involve GPS based control in real-time of relative positions of the individual mowers and/or other wireless direct or indirect communication between the robotic lawn mowers. Ways for avoiding undesired effects of mowers touching or running into each other may also be included, e.g. a) the above-mentioned sensors hindering mowers from running into unforeseen physical obstacles encountered during work on a lawn, and/or b) extra guiding and delineating cables defining subareas of a larger lawn. Individual delineated subareas may be associated with separate base stations. Typical larger lawns requiring two or more robotic lawn mowers are football fields/pitches, park areas etc.

In the most preferred variant of the method the robotic lawn mowers are electric as discussed under the system aspect of the invention.

In a preferred variant of the inventive method, step (i) is preceded by a prestep in which the plurality of lawns is divided into two or more groups (=fractions) (A, B, C, . . . ) each of which comprises a number of lawns ($n_A$, $n_B$, $n_C$, . . . ). In this variant steps (ii)-(iv) are carried out on the lawns of a first group of lawns and followed by a step (v) comprising repeating steps (ii)-(iv) on a group of lawns not being mowed in a previous step (iii) up to the point where all lawns of the plurality of lawns have been cut. Whenever needed, there may be inserted a recharging step (v) after a sequence (ii)-(iv). The number of lawns in each group is at least one with preferences for at least two, three or more. The numbers are determined by the total number of lawns in the plurality, the number of holders and/or mowers in the stand or on the carrier, and the number of mowers which is to be placed on the individual lawns in each groups. If only one mower is placed on every lawn, the number of lawns in each group is typically at most equal to the number of mowers and/or holders on the carrier.

The prestep of dividing the plurality of lawns into groups may equivalently be carried out as a part of step (i), i.e. before or after the robotic lawn mower and/or the carrier has been physically provided. In other words this prestep shall be regarded as a part of step (i).

The repetitions of the sequence steps (ii)-(iv) are typically carried out on different days, typically with one or more nights between two consecutive repetitions.

Step (iii) comprises two main alternatives:
a) delivery and starting at least one mower to one lawn before delivery of at least one mower to the next lawn, and
b) delivery of mowers to several lawns and starting them afterwards (typically remotely). Alternative (a) is preferred.

Starting in step (iii) preferably comprises that the mower is allowed to dock to the base station of the lawn for a) pairing and activation of the cutting program of the lawn and/or b) activation of the geofence alarm and other lawn specific functions. This docking may be via wire or wireless.

In a still further preferred variant of the method of the invention there is wireless communication between the mower control unit and the common control unit. This means the extra step of receiving information from individual robotic lawn mowers via the common control unit of the inventive system, e.g. via software placed as an app on an external digital unit, e.g. a smart phone, PC or other digital unit, during at least steps (iii) and/or (iv).

Further variants of the method aspect of the invention may utilize applicable features defined under the headings "First aspect (system)" and "Third aspect (carrier)". The preferences for corresponding features are essentially the same in the method aspect as in the system and carrier aspects.

Third Aspect of the Invention (Carrier)

This aspect of the invention is a carrier (105a,105b,111, 205) for two or more electric robotic lawn mowers (101a,b . . . , 101'a,b . . . , 201a,b . . .) which are essentially equal. Every one of the robotic lawn mowers has a rechargeable battery with an electric contact (232) placed on the robotic lawn mower (201) for recharging the battery. The main characteristic feature is that the carrier comprises:

A) two or more holders (107a,b . . . , 112a,b . . . , 207a,b . . .) which geometrically and functionally are essentially equal in being capable of retaining one robotic lawn mower per holder, B) an electric charging system (231/235+233+234) for recharging the batteries of robotic lawn mowers (101a,b . . . , 101'a,b . . . 201a,b . . .) placed in the holders (107a,b . . . , 112a,b . . . , 207a,b . . .).

The two or more holders (107a,b . . . , 112a,b . . . , 207a,b, . . .) are typically part of a stand (106,111,206) as discussed in detail below.

The carrier (105a,105a+b,111,205) of the invention may be used for a) transportation of robotic lawn mowers loaded in the holders of the stand between the lawns and a storing facility (110) and/or within a storing facility (110) and/or b) storage of electric robotic lawn mowers in a storage facility (110).

In the case the carrier shall be used for transportation it is important that the carrier is mobile and capable of delivering and/or fetching robotic lawn mowers, e.g. to and/or from their working areas (lawns).

The carrier (105a,105a+b,111,205) comprises at least the holders and, if present, the stand (106,111,206). In certain variants as illustrated in FIG. 1 and FIG. 2 the stand may coincide with the carrier (111;205/206).

The typical stand comprises a framework defined by two or more horizontal shelves and two or more vertical walls. The holders are present in the spaces defined by the crossings of the shelves and the walls of the stand. Each empty space defined between crossings of the shelves and the walls may contain a row of one, two or more holders placed side by side.

One example of a stand is in the form of framework of a supporting structure defined by horizontal and vertical poles and/or plate material attached to each other.

In another example the framework of the stand is defined by a number of boxes attached to each other side by side as explained further down. In this variant the top and bottom sides of the boxes will define the shelves and left and right sides will define the vertical walls of the framework. See FIG. 2.

A non-preferred variant of a stand with holders are hooks and the like on a horizontal or vertical pole or a vertical wall, a ceiling or the like. A hook and the like may be combined with a harness for retaining a robotic lawn mower.

A holder is generally defined as a space or compartment large enough for retaining a robotic lawn mower. When being present in a framework defined by horizontal shelves and vertical walls, the typical holder (107a,b . . . , 207a,b . . . , 111a,b . . .) has an inlet side also called front side (215), a rear side (220), a left side (217), a right side (216), a bottom side (218) and a top side (219). The front side (215) is opposite to the rear side (220) and comprises an inlet opening (214) for insertion of a robotic lawn mower (201) into the holder (207) (FIGS. 2a and c). One or more of the rear side, the left side, the right side, the bottom side and the top side may be in the form of a physical wall which may be closed or partly open. In the extreme, a side may be in the form of a virtual wall, i.e. devoid of any physical wall and fully open. Such a wall is only defined by the supporting structures of the framework of the stand. The bottom side normally comprises a physical wall because it needs to exhibit physical structures (floor) hindering a robotic lawn mower placed in the holder from falling down. This physical structure should retain the mower in an essentially horizontal position. The top side of a holder typically comprises a physical wall, in particular when it coincides with the bottom side of another holder of the stand.

If not otherwise expressly indicated, the term "wall" will mean a physical wall. In the figures a wall has the same reference numeral as the corresponding side. This applies to both physical and virtual walls.

Partly open means that a wall is physical and comprises one or more holes or open areas (229,230). These holes and open areas allow for free access of ambient air, e.g. comprises a grid, a grating or the like, such as open areas defined by parallel or crossing bars, strings or the like. A closed wall comprises no holes allowing free access of ambient air (also called fully closed in this specification).

The number of holders on a carrier is typically $\geq 2$, $\geq 3$, $\geq 4$, $\geq 5$ or $\geq 10$ and/or $\leq 200$, $\leq 100$, $\leq 50$ $\leq 25$ including also intervals defined by the combination of any of the $\geq$-values with any of the $\leq$-values. The exact number is dependent on what the carrier is intended for. If used in the system aspect of the invention it typically will depend on the number of lawns a caretaker is responsible for, frequency of cutting, number of carriers in the system etc. Typical numbers for this use are found within the above-given intervals and even $\leq 10$. For storage purposes the number may be higher, e.g. up to 5000, such as up to 3000 or up to 1000.

It is beneficial if the inner measure and inner design of individual holders fits to the design of robotic lawn mowers from different manufacturers. Typical inner measures which comply with this criterion are height 30-40 cm, width 60-70 cm and length 75-90 cm.

In the preferred variant the stand (106,111,206) is defined by two or more holders which are attached side-by-side to each other (e.g. the top side of one holder to the bottom side of another holder and/or the left side of one holder to the right side of another holder). All sides, except for the front side comprise a physical wall that may be fully closed or partly open. The front side comprises the inlet opening for a robotic lawn mower. For details see legends to FIGS. 2 and 3 below.

The holders in this variant may be made of plastics, metals and the like. The preferred metal is aluminum.

The holders in the preferred variant of the stand may in an advantageous form be locked to each other via a pair of matching structures in the outside of the wall of their right, left, top, and bottom sides. For details see legends to FIGS. 2 and 3 below, Generally one member of the pair is present in the right side and the bottom side while the other member is present in the left side and in the top side. These structures are preferably designed such that one holder will become attached to another holder by sliding and/or pressing:

i) the outside of the wall of the top side (219,319) of one holder against the outside of the wall of the bottom side (218,318) of the other holder, and/or ii) the outside of the wall of the left side (217,317) of one holder against the outside of the wall of the right side (216,316) of the other holder, with the proviso that the other holder in (i) is not the same holder as in (ii).

The pair of matching structures may be of two major types a) matching structures which requires a separate element (221) which provides two structures one of which is capable of mating directly with at least one member of the pair while the other structure is capable of mating directly with at least the other member of the pair. (see legends to FIG. 2*a-e*) (indirectly mating structures), and b) matching structures which are capable of directly mating with each other when present on different holders (directly mating structures) (see legends to FIG. 3)

Matching structures of type (a) may be represented by a pair in which the two members of the pair are identical. As illustrated in FIG. 2*a-e* the pair of matching structures may be "grooves" while the structure mating with this structure is provided on opposite sides of a separate element ("rails").

Matching structures of type (b) are illustrated in FIG. 3 and may be a pair in which one member of the pair is represented by one or more parallel rails and/or one or more knobs
 i) in the outside of the wall of the top side and of the right side, or
 ii) in the outside of the wall of the bottom side and of the left side, and
the other member is represented by grooves capable of mating with the rails and/or local depressions capable of mating with the knobs in the remaining two sides.

Knobs and depressions may be arranged in rows or be solitary. Other variants are possible.

There may also be included a locking function for securing a) locking of the holders to each other side by side, and/or b) a simple release of the holders from each other when there is a desire to dismantle the stand into free holders. See for instance the outwardly enlarged rails and inwardly enlarged grooves presented in FIGS. 2 and 3. The locking function may be possible to activate/deactivate, e.g. be spring actuated. The locking function for keeping the holders together may alternatively include other means, for instance threaded rods, bolts, nuts etc (not shown). These alternative means may be combined with the principles discussed above and illustrated in the figures.

The stand of the preferred variant given above may alternatively be built of blocks each of which comprises at least two or more holders. The blocks in turn may be locked to each other in the same manner as when singular holders are used as building units.

At least a section of at least one of a bottom wall (218), a top wall (219) and a left and a right side wall (217 and 216, respectively) comprises in a preferred carrier variant one or more holes or openings (229,230) which permit free access of ambient air into the holder (207). These holes or openings may be in the form of a grating or grid as discussed above. In further preferred variants the position for this section is in the bottom wall and with advantage close to the inlet opening (214) or to the rear side (220). In still further preferred variants the section which contains an opening/holes/grating is present in two walls, preferably the top and the bottom walls (219 and 218, respectively) with the same preferred position in the walls as before. In a bottom wall which has a section with one or more holes, the remaining part of the inner bottom is with advantage sloped downwards toward the section. For single holes and other open areas, gratings or grids placed in the bottom and/or side wall, it is of advantage that they are coarse enough for drainage of water and coarse material, i.e. dirt, such as sand, gravel, soil etc, from used mowers. Gratings, grids and single holes and other openings in the bottom and top sides of a holder preferable stretch between the left wall and the right wall in order to minimize accumulation of moisture and dirt at this position of the holder. Shelves as part of the bottom wall at inner edges and corners of a holder should be avoided.

Every holder preferably comprises a fixation function (236) which typically is placed at the inlet opening (214). This function shall secure that a) a robotic lawn mower placed in the holder is retained in the holder and/or b) there is a charging connection between an electrical contact (231/235) present in interior of the holder and an electric contact (232) on the robotic lawn mower (201) (see below).

The fixation function with its means is preferably placed at the inlet side (215). The means for fixation then typically comprises a rod or the like stretching from at least one side of the inlet opening to a contact area on a mower placed in the holder. This contact area is typically on a side of the mower which is next to the inlet opening. The means may be made of metal, plastics, woven material or the like. The means used by the function is preferably removable to permit easy loading and unloading of robotic mowers.

There is an advantage if the holders are foldable, for instance by being articulated at the edges where the bottom and top walls meet the right and the left walls. A rear wall, if present, should be possible to fold up, remove or be virtual. Folded holders when stacked together will require much less space than unfolded. The gain in space may be 25% or more, such as ≥50%, for folded holders compared to unfolded holders. Storing of empty folded holders may be beneficial during a) winter time when the need for grass mowing is low and a care taker for green areas might desire to store the stand in dismantled form to release the carrier (car, trailer, truck ec) or storing space for other purposes, or b) summer time when the need is low for winter storing of robotic lawn mowers.

Stackable holders should be devoid of projecting matters. There are also other ways of stacking empty holders with a gain in space of 25% or more.

The stand may also comprise a base plate. This plate may be defined by the bottom of the lowest layer of holders or by a separate plate onto which the stand has been securely mounted.

The electric charging system of the carrier (205) comprises a) an electric contact (235/231) in the interior of every holder (207) matching the electric contact (232) on a robotic lawn mower (201) placed in the holder, b) one or more other electrical contacts (233) for connecting the charging system to an electric power supply system, and c) a cabling (234) between holder contacts of type (a) and the contacts of type (b).

The electric contact (a) is preferably in the form of a replaceable adapter (235) which is specific for a particular model and/or manufacturer of robotic lawn mowers. The most important differences between models and manufacturer in relation to the present invention are the design of the charging contact on the mower and the length of the robotic lawn mowers. The adapter used as electric contact (a) therefor has a length and a design fitting to the particular model to be loaded in the holder of the carrier of the invention. The part of the adapter in contact with the charging contact of the robotic lawn mower is typically in the form of a contact strip (231).

The electric contact (233) of (b) is typically placed on the exterior part of the holders (207) or the stand (206), for instance on the front side (215) of each holder. As an alternative the contact of type (b) may include that the holders are arranged in one or more groups with one such electric contact for each group. In the extreme there is only one common contact (b) for all holders of the stand.

The electric charging system (231/235+233+234) of the carrier typically makes it possibly to charge the batteries of any and all of the electric robotic lawn mowers placed in the holders of the carrier, preferably by simultaneous charging. The electric power supply system is preferably external to the carrier.

In the case the carrier is to be used for transportation of robotic lawn mowers, it is advantageous with mobile carriers. This in particular applies to the system and method aspect of the invention.

A mobile carrier comprises means which facilitates moving of the carrier. Moving means includes e.g. wheel, possibly combined with a motor on the carrier (automobile carrier). Thus a mobile carrier is preferably in the form of a vehicle, such as a car, a trailer and the like. For smaller carriers, e.g. containing 2, 3, 4, ... up 5, 6, 7 or more holders, the means for moving may include a handle for manually carrying the stand with or without its robotic lawn mowers, for instance to and from a transportation vehicle. For intermediary sized carriers of the invention the carrier may comprise wheels attached to the base plate of the carrier. In this latter case there may also be some kind of handle for pushing, pulling and/or steering the carrier. Handle in this context includes a stick, a knob, a steering wheel and the like. Larger sized carriers are typically in the form of a car (e.g. a van or an estate car) or a trailer. For cars and trailers the stand is typically placed in the cargo space. Larger sized carriers are typically used for longer transportations, e.g. between lawns and storage facilities at different geographical locations Further variants of the carrier aspect of the invention may utilize applicable features defined under the headings "First aspect (system)" and "Second aspect (method)". The preferences for corresponding features are essentially the same in the carrier aspect as in the system and method aspects.

LEGENDS TO FIGS. 1-3

FIG. 1 Important parts of the inventive system.

This figure shows a typical electric robotic lawn mower (101) with the two or more robotic lawn mowers being indicated with the reference numerals 101a,b .... There is also shown a plurality of lawns (102a,b ...) which each is delineated by a fence (103a,b ...) to which a base station (104a,b ...) is connected, and an automobile carrier (105a+b) comprising a trailer (105a) and a car (105b). The trailer (105a) comprises a stand (106) with two or more holders (107a,b ...). Each holder is capable of retaining one robotic lawn mower (101). Four of the robotic lawn mowers (101a-d) have been delivered and docked to the base station of four different separate lawns (102a-d) where they at present are working. The remaining robotic mowers (101e,f ...) which are still present on the automobile carrier (105a+b) are under transport to other lawns not shown in FIG. 1. The caretaker (108) is from time to time checking the already delivered robotic lawn mowers (101a-d) via a server (not shown) on his personal digital unit (109). The digital unit is in the form of a smart phone. Software belonging to the control system of the inventive system is not shown. Various parts of this software are present on the robotic mowers, the base stations, a server (not shown) and the caretaker's personal digital unit as discussed in more details above. Communication between the robotic lawn mowers (101a,b ...) and the digital unit (109) is wireless via a net (not shown) common for other digital units. A storing facility (110) comprising an immobile stand (111) carrying a large number of holders (112a,b ...) for robotic lawn mowers (101'a,b ...) is also shown. The stand and the holders are preferably as defined in this specification. The storing facility may have interior spaces and equipment for long term storage and service on the robotic lawn mowers.

FIGS. 2a-e: A stand which comprises modules in the form of holders (indirectly mating locking structures on holders)

This figures shows a variant in which the stand (206) as such is the carrier (205) and contains six holders/modules (207a,b ...) for electric robotic lawn mowers (201a,b ...).

FIG. 2a The view is from the front side (215) of the holders with the front (213) of the robotic lawn mowers inserted into the holders via the inlet opening (214) (see FIG. 2c).

FIG. 2b shows a holder from below or from above.

FIG. 2c shows a cross-sectional view of a holder seen from the right side (216) or from the left side (217) of the holder (201). The view is through a plane which is orthogonal to the paper and passing through the line A-B of FIG. 2b.

FIG. 2d shows a holder (207) seen from the outside of the rear side (220).

FIG. 2e shows a separate element (221) used for linking holders (207a,b ...) together to form the stand (206).

Figure 1:
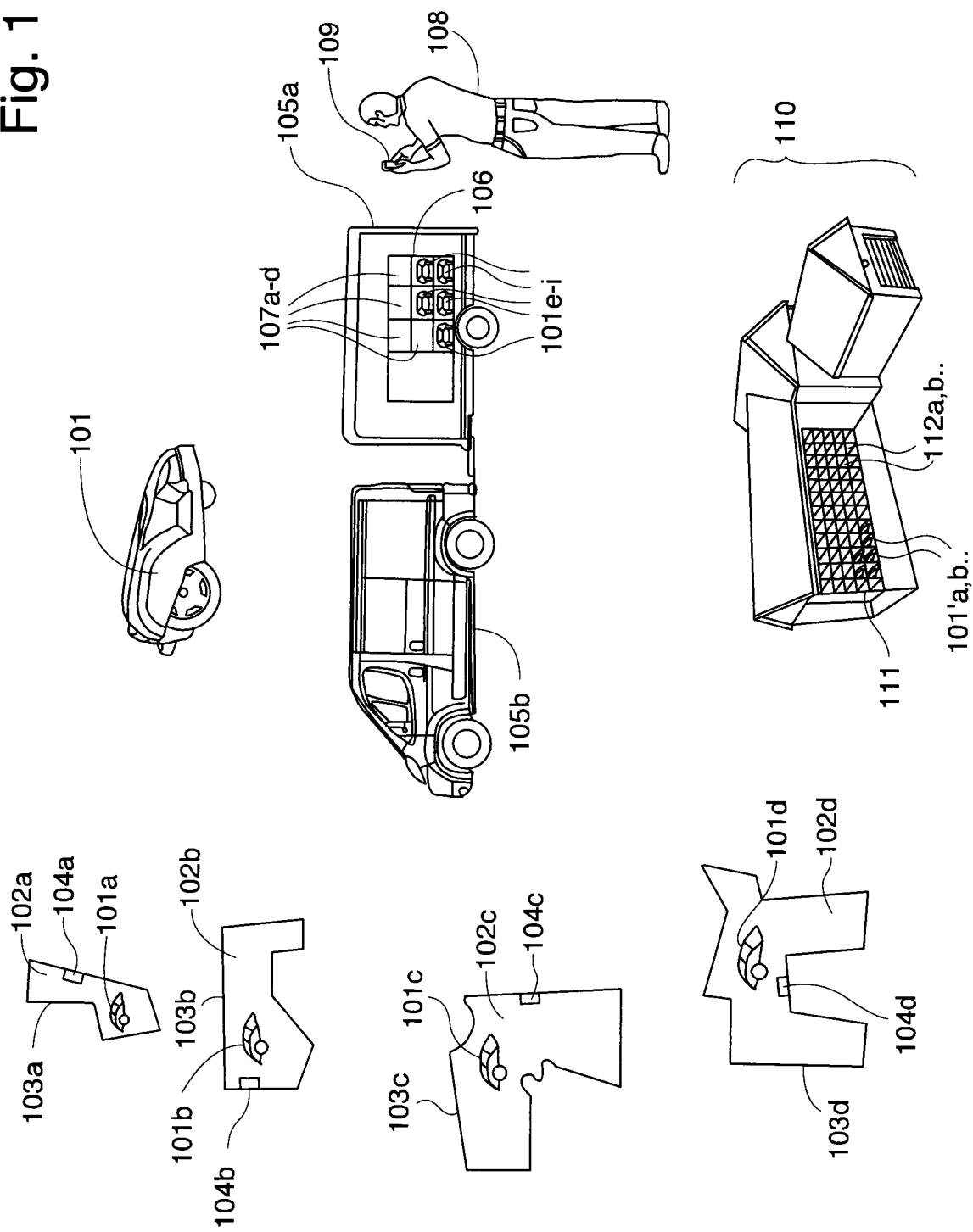

Every holder has five sides with a wall (physical) and one side without a wall. The sides with a wall are the right and the left side walls (216 and 217, respectively), the bottom wall (218), the top wall (219), and the rear wall (220). The front side (215) is without a wall and instead has an inlet opening (214).

For easy collection of several holders (207a,b ...) to a stand (206), the outside of each of the right side wall (216), the left side wall (217), the bottom wall (218) and the top wall (219) of every holder have a groove (222,223,224,225) stretching from the front side (215) to the rear wall (220) as shown in FIGS. 2b, c and e. By the use of the separate elongated element (221) shown in FIG. 2e any of two holders (207) can be linked together side by side (top side to bottom side and/or left side to right side) as shown in FIG. 2a. The elongated element (221) exhibits in one direction an elongated structure (226) ("rail") having a geometry mating with the groove in one side of a holder and in the opposite direction a parallel elongated structure (227) ("rail") mating with a groove in the outside of another holder. In FIGS. 2a-e the grooves are expanding inwards from the surface of a wall while each of the two mating structures on the separate elongated element (221) are expanding outwards from the elongated center (228) of the element (221). This means that two holders will be locked together side by side in the stand if the two "rails" of an element (221) are inserted into the grooves of separate holders as illustrated in FIG. 2a. By using identical grooves in the four sides of every holder, a very convenient way of construing and dismantling stands of different capacities will be provided.

This variant of holders will not have any projecting parts which will simplify storing of them as separate parts. If holders are made foldable they can be folded together and stacked together requiring a minimum of space for storage. Foldability is accomplished by making edges between walls articulated.

In order to allow for air circulation and drainage of water and dirt from mowers collected from lawns, each of the rear ends of the bottom wall (218) and the top wall (219) wall are equipped with a hole such as an open area (229,230) permitting drainage of water and dirt.

The stand/carrier (206/205) illustrated in FIG. 2 also comprises a variant of a charging system for charging a rechargeable battery of an electric robotic lawn mower (201) placed in a holder (207). This charging system have a) an electrical contact (231) associated with the inner side of the rear wall (220) matching the electrical charging contact (232) on the front (213) of an electric robotic lawn mower (201) placed in the holder (207), b) an electric contact (233) placed on the front side (215) of the holder for connection to an external system for power supply, and (c) a cable (234) connecting the two contacts (231 and 233) on the holder (207) with each other. The electric contact (a) (231) associated with the inner side of the rear wall (220) may be designed as or be part of an adapter (235) specific for the specific kind of robotic lawn mower (201) used. As discussed generally elsewhere in the specification there are many alternatives for designing charging systems with two kinds of contacts (a and b) and a cabling (c) of the inventive stand or carrier.

The holder may comprise a function (236) for holding a robotic lawn mower (201) placed in a holder (207) in a fixed position thereby securing electrical contact between the contact (231) of the holder's charging system and the front contact (232) of the robotic mower (201). This fixation function is preferably releasable/removable and may comprise a rod (237) attached resiliently to the frame of the inlet opening (214) and pressing against the back of a mower (207) placed in the holder. In FIG. 2a the fixation function of the holder is cooperating with a handle (238) on the mower. This handle has a vertical hole (239) through which the rod is passing.

The stand may be part of a suitable wheel equipped mobile carrier (105a,105a+b) of the invention by being mounted in the cargo space of a combi car, a van, a lorry or truck, a trailer etc (as illustrated in FIG. 1). The cargo space is preferably covered. The stand (111) as such may also be fixedly mounted in a storing facility (110) and then used as an immobile carrier (see FIG. 1), or mounted on a base plate equipped with wheels or other moving means for easy handling within the storing facility.

FIG. 3 Stands and holders (directly mating locking structures on holders).

The three holders (307a,b,c) of FIG. 3 are viewed from the front side (315a,b,c). The figure illustrates an alternative way of linking holders together to form a stand as defined in the present invention. In this variant the locking structure (322a,b,c) on the outside of a right side wall (316a,b,c) of a holder (307) is capable of directly mating with the locking structure (323a,b,c) on the outside of the left side wall (317a,b,c) of another holder (307). Similarly the locking structure (325a,b,c) of the outside of the top wall (319a,b,c) in a holder (307) is capable of mating directly with locking structure (324a,b,c) of the outside of the bottom wall (318a,b,c) of another holder (307). This is illustrated in FIG. 3 where:

a) Each of the left wall (317a,b,c) and the top wall (319a,b,c) of every holder (307a,b,c) exhibits a groove (323a,b,c and 325a,b,c respectively) stretching from front side (315) to the rear side (320), and b) Each of the right wall (316a,b,c) and the bottom wall (318a,b,c) exhibits a corresponding rail (322a,b,c and 324a,b,c, respectively).

The grooves (323,325) are of the same kind and function as the locking structure (222,223,224,224) on the holders of FIG. 2. The rails (322,324) are of the same kind and function as the locking structures (226,227) on the elongated element (221) of FIG. 2e.

BEST MODE AT THE PRIORITY DATE

It is believed that the best mode of the system and of the method at the priority date and the filing date of this specification utilizes
a) battery powered robotic lawn mowers,
b) electric fences around the individual lawns to be cut,
c) a base station linked to each fence for recharging and docking of robotic lawn mowers,
d) carriers in the form automobile carriers (cars) with a stand as described in the legends to FIG. 2 with other preferences given under the heading "Third aspect (Carriers)",
e) remote control of the system, including the mowers, via a server and a personal digital unit.

The robotic lawn mowers used comply with the features given in claims 2-6 with as high value as possible for the features given in claim 4. For the method the best mode also comprises the variant defined in claim 9. For carriers used for transportation the best mode comprises the best mode carriers for the system and method. The best mode for carriers used for storage purposes comprises the stand described in legends to FIG. 2.

PATENT EXAMPLES

Example 1

In this example there are 50 separate public green areas (=lawns) of different sizes to be cut, typically 2000-3500 m$^2$ each. The distances for transportation between this kind of green areas are relatively long. Every area is delineated by an electric fence with a base station for recharging and for providing power to the electric fence. In this example, one caretaker handles 10 electric robotic mowers loaded on a mobile carrier in the form of trailer comprising a stand with ten holders for the 10 battery powered robotic lawn mowers (Husqvarna Automower® 330 model 2015 (Huskvarna Sweden). The carrier comprises a charging system which is connectable to an external power supply system as discussed in the specification. The mowers and base stations have software and are capable of communication with each other as discussed in the specification. The mowers in addition are capable of wireless communication with an app on the caretaker's smart phone. The app corresponds to the common control unit of the system used.

In the morning of the first day 1 (Monday) one mower is placed on every lawn 1-10. All mowers are allowed to dock to the base station of the lawn on which they are placed and allowed to work during the day until the lawns are cut. The mowers are fetched in the afternoon/evening, stored and connected to an external power supply system at a storing facility during night time. During day time the caretaker may check for error reports and well-being of mowers via his smart phone. In the morning the next day the same mowers are placed on lawns 11-20 and handled in the same way as day 1 etc. After five days all lawns have been attended to. The procedure is repeated every week during a season. The procedure with leaving and fetching the robotic mowers will correspond to 50% of full time for an employee handling this.

Example 2

The system used is the same as in example 1. It is now applied to the lawns of 50 private homes. The area of each lawn is in the range of 500-1500 m². The distances for transportation between the areas are relatively short. A weekly cutting is offered by an entrepreneur. The entrepreneur is using 10 robotic lawn mowers. The mowers and the transport vehicle are of the same kind as in example 1. By following the same schedule for placing out and fetching the mowers as in example 1, the entrepreneur will manage to handle 50 gardens per week with a good profit by the use of an employee working at most 30% of full time. Every private owner will gain a lot of spare time to do other things together with a good feeling of an environmentally good conscience. He will know that his lawn will be professionally cut on a fixed day every week with the only precaution that he has to clean his lawn from disturbing matters before the entrepreneur is placing out the mower.

While the invention has been described and pointed out with reference to operative embodiments thereof, it will be understood by those skilled in the art that various changes, modifications, substitutions and omissions can be made without departing from the spirit of the invention. It is intended therefore that the invention embraces those equivalents within the scope of the claims which follow

The invention claimed is:

1. A system for cutting grass of a plurality of lawns, the system comprising:
A) two or more robotic lawn mowers which each has a rechargeable energy storage, each of said two or more robotic lawn mowers being operable, via consumption of energy from said rechargeable energy storage, to cut grass at a respective one of the plurality of lawns,
B) a mobile carrier comprising means for mobility to transport said two or more robotic lawn mowers, and also comprising:
  a) at least two holders, each of which is capable of retaining one of said two or more robotic lawn mowers, and
  b) a charging system for said rechargeable energy storage,
C) two or more fences, each fence being electrically operable and delineating an individual lawn of the plurality of lawns and configured to be operable while a respective one of said two or more robotic lawn mowers is operating at the respective one of the plurality of lawns, and
D) two or more power arrangements, each power arrangement being associated with a respective fence and being configured to provide electrical energy to the respective fence, each power arrangement comprising:
  a) a fixed part placed at the respective lawn, and
  b) a removable part which is removable from the fixed part and contains at least one of:
    i) a circuit card necessary for providing voltage to said fence, and
    ii) a battery or solar cell providing voltage to said fence,
  wherein each power arrangement is configured to identify a respective robotic lawn mower, and pair the respective robotic lawn mower with a respective lawn when the respective robotic lawn mower is placed on the respective lawn,
wherein the mobile carrier transporting said two or more robotic lawn mowers from a location remote from the plurality of lawns to the plurality of lawns, with each of said two or more robotic lawn mowers being taken to the respective one of the plurality of lawns, each of said two or more robotic lawn mowers operating to cut grass at the respective one of the plurality of lawns, and the mobile carrier transporting said two or more robotic lawn mowers from the plurality of lawns subsequent to the operation of cutting grass at the plurality of lawns.

2. The system of claim 1, wherein said robotic lawn mowers have a weight in the range of 5-21 kg and at least one exhibits a weight to cutting capacity ratio, WCCR, value in the range of 0.01-0.2 kg/m²/hour.

3. The system of claim 1, wherein:
a) said rechargeable energy storage, of each of the two or more robotic lawn mowers, is a rechargeable battery, and
b) said charging system is capable of connecting the holders of the carrier to an external electrical power supply system.

4. The system of claim 1, wherein every one of said two or more mowers are capable of at least one of:
a) a daily effective cutting time of ≥1 hour/mower,
b) a cutting capacity of ≥100 m²/hour,
c) a cutting time without recharging of ≥1.5 hours/mower, and
d) cutting area without recharging of 200 m²/mower.

5. The system of claim 4, comprising software for recharging the rechargeable batteries, which software and rechargeable batteries are adapted to each other to optimize at least one of a) the daily effective cutting time/mower, b) a mean cutting capacity, c) the cutting time without recharging and d) the cutting area without recharging.

6. A system for cutting a plurality of lawns, the system comprising:
A) two or more robotic lawn mowers which each has a rechargeable energy storage,
B) a mobile carrier comprising means for mobility, and also comprising:
  a) at least two holders, each of which is capable of retaining one of said two or more robotic lawn mowers, and
  b) a charging system for said rechargeable energy storage;
C) two or more electrically-operated fences delineating individual respective lawns to be mowed, and
D) two or more power arrangements, each power arrangement being associated with a respective fence and being configured to provide electrical energy to the respective fence, each power arrangement comprising:
  a) a fixed part placed at the respective lawn, and
  b) a removable part which is removable from the fixed part and contains at least one of:
    i) a circuit card necessary for providing voltage to said fence, and
    ii) a battery or solar cell providing voltage to said fence,
  wherein each power arrangement is configured to identify a respective robotic lawn mower, and pair the respective robotic lawn mower with a respective lawn when the respective robotic lawn mower is placed on the respective lawn.

7. The system of claim 1, wherein each power arrangement is configured to activate a geofence alarm when one of the two or more robotic lawn mowers is placed on the respective lawn.

8. The system of claim 6, wherein each power arrangement is configured to activate a geofence alarm when one of the two or more robotic lawn mowers is placed on the respective lawn.

9. The system of claim 3, wherein the external electrical power supply system is at a storing facility comprising a house that is separate from the mobile carrier.

10. A system for cutting grass of a plurality of lawns, the system comprising:
   A) two or more robotic lawn mowers which each has a rechargeable energy storage, each of said two or more robotic lawn mowers being operable, via consumption of energy from said rechargeable energy storage, to cut grass at a respective one of the plurality of lawns,
   B) a mobile carrier comprising means for mobility to transport said two or more robotic lawn mowers, and also comprising:
      a) at least two holders, each of which is capable of retaining one of said two or more robotic lawn mowers, and
      b) a charging system for said rechargeable energy storage,
   C) two or more fences, each fence being electrically operable and delineating an individual lawn of the plurality of lawns and configured to be operable while a respective one of said two or more robotic lawn mowers is operating at the respective one of the plurality of lawns, and
   D) two or more power arrangements, each power arrangement being associated with a respective fence and being configured to provide electrical energy to the respective fence, each power arrangement comprising:
      a) a fixed part placed at the respective lawn, and
      b) a removable part which is removable from the fixed part and contains at least one of:
         i) a circuit card necessary for providing voltage to said fence, and
         ii) a battery or solar cell providing voltage to said fence,
   wherein each power arrangement is configured to activate a geofence alarm when one of the two or more robotic lawn mowers is placed on the respective lawn
   wherein the mobile carrier transporting said two or more robotic lawn mowers from a location remote from the plurality of lawns to the plurality of lawns, with each of said two or more robotic lawn mowers being taken to the respective one of the plurality of lawns, each of said two or more robotic lawn mowers operating to cut grass at the respective one of the plurality of lawns, and the mobile carrier transporting said two or more robotic lawn mowers from the plurality of lawns subsequent to the operation of cutting grass at the plurality of lawns.

11. A system for cutting a plurality of lawns, the system comprising:
   A) two or more robotic lawn mowers which each has a rechargeable energy storage,
   B) a mobile carrier comprising means for mobility, and also comprising:
      a) at least two holders, each of which is capable of retaining one of said two or more robotic lawn mowers, and
      b) a charging system for said rechargeable energy storage;
   C) two or more electrically-operated fences delineating individual respective lawns to be mowed, and
   D) two or more power arrangements, each power arrangement being associated with a respective fence and being configured to provide electrical energy to the respective fence, each power arrangement comprising:
      a) a fixed part placed at the respective lawn, and
      b) a removable part which is removable from the fixed part and contains at least one of:
         i) a circuit card necessary for providing voltage to said fence, and
         ii) a battery or solar cell providing voltage to said fence,
   wherein each power arrangement is configured to activate a geofence alarm when one of the two or more robotic lawn mowers is placed on the respective lawn.

\* \* \* \* \*